US010305765B2

(12) United States Patent
Church et al.

(10) Patent No.: US 10,305,765 B2
(45) Date of Patent: May 28, 2019

(54) ADAPTIVE SELECTION OF MESSAGE DATA PROPERTIES FOR IMPROVING COMMUNICATION THROUGHPUT AND RELIABILITY

(71) Applicant: International Business Machines Corporation, Armonk, NY (US)

(72) Inventors: Kenneth W. Church, Dobbs Ferry, NY (US); Martin Franz, Yorktown Heights, NY (US); Nicholas S. Kersting, Briarcliff Manor, NY (US); Jeffrey S. McCarley, Bedford Hills, NY (US); Jason W. Pelecanos, Ossining, NY (US); Weizhong Zhu, Hartsdale, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 6 days.

(21) Appl. No.: 15/656,128

(22) Filed: Jul. 21, 2017

(65) Prior Publication Data

US 2019/0028370 A1    Jan. 24, 2019

(51) Int. Cl.
*G06F 11/00* (2006.01)
*H04L 12/26* (2006.01)
(Continued)

(52) U.S. Cl.
CPC .......... *H04L 43/08* (2013.01); *G06F 11/1004* (2013.01); *H04L 1/0061* (2013.01);
(Continued)

(58) Field of Classification Search
CPC ...... H04L 43/08; H04L 1/0061; H04M 3/493; G06F 11/1004
See application file for complete search history.

(56) References Cited

U.S. PATENT DOCUMENTS 7,809,376 B2 * 10/2010 Letourneau ....... H04M 3/42161
                                                    370/352
7,830,812 B2 * 11/2010 Atkins .................. H04L 41/142
                                                    370/252
(Continued)

FOREIGN PATENT DOCUMENTS

CN        1065973 C      5/2001
CN      102620766 A      8/2012
(Continued)

OTHER PUBLICATIONS

Mell et al.; "The NIST Definition of Cloud Computing—Recommendations of the National Institute of Standards and Technology"; U.S. Department of Commerce, National Institute of Standards and Technology; Sep. 2011; 7 pages.
(Continued)

*Primary Examiner* — Esaw T Abraham
(74) *Attorney, Agent, or Firm* — Cantor Colburn LLP; Rahan Uddin

(57) ABSTRACT

Embodiments of the present invention provide a computer-implemented method for communicating a reference code for a transaction. The method monitors a communication session conducted between a user and an agent via a communication channel, extracts user and channel properties from the monitored communication session, selects a reference code from a set of references codes stored on a database, in which the selection is based at least in part on the extracted communication channel properties and the extracted user properties, and then communicates the selected reference code to the user.

17 Claims, 8 Drawing Sheets

(51) Int. Cl.
*G06F 11/10* (2006.01)
*H04L 1/00* (2006.01)
*H04L 29/08* (2006.01)
G06F 17/30 (2006.01)
H04M 3/493 (2006.01)

(52) U.S. Cl.
CPC ........ *H04L 67/22* (2013.01); *G06F 17/30864* (2013.01); *H04M 3/493* (2013.01)

(56) References Cited

U.S. PATENT DOCUMENTS

| | | | |
|---|---|---|---|
| 7,980,782 | B2 | 7/2011 | Bleiner et al. |
| 8,401,926 | B2* | 3/2013 | Benzon ............. G06Q 30/0631 |
| | | | 705/26.7 |
| 8,538,743 | B2 | 9/2013 | Gago et al. |
| 8,605,718 | B2* | 12/2013 | Hemar .................. G06Q 30/02 |
| | | | 370/259 |
| 8,954,329 | B2 | 2/2015 | Labsky et al. |
| 9,384,731 | B2 | 7/2016 | Tjalve et al. |
| 9,448,784 | B2* | 9/2016 | Buzaski ............ G06F 17/30174 |
| 9,904,517 | B2* | 2/2018 | Carmi ....................... G06F 8/10 |
| 2002/0184029 | A1 | 12/2002 | Brittan et al. |
| 2004/0172258 | A1 | 9/2004 | Dominach et al. |
| 2004/0192312 | A1* | 9/2004 | Li ............................. H04L 1/16 |
| | | | 455/445 |
| 2005/0233733 | A1* | 10/2005 | Roundtree .......... G06F 9/45512 |
| | | | 455/414.1 |

FOREIGN PATENT DOCUMENTS

CN 102620766 B 11/2014
JP 2005108054 A 4/2005

OTHER PUBLICATIONS

Shannon; "A Mathematical Theory of Communication"; The Bell System Technical Journal, vol. 27; Jul. & Oct. 1948; 55 pages.
Stone et al.; "Performance of Checksums and CRC's over Real Data"; IEEE/ACM Transactions on Networking, vol. 6, No. 5; Oct. 1998; pp. 529-543.

* cited by examiner

| Extracted Property 1 | Extracted Property 2 | Extracted Property 3 | Extracted Property M | Reference Code (alphanumeric) |
|---|---|---|---|---|
| None | None | None | ... | abclmnopr12345 + chksm |
| Text Communication | None | None | ... | abc8mnopry2345 + chksm (no 1's and L's) |
| Telephone Communication | None | None | ... | a8clmno4r12345 + chksm (no B's and P's) |
| Telephone Communication | User's Primarily Language doesn't Distinguish L's and R's | None | ... | a8cxmno4y12345 + chksm (no B's, P's, L's, and R's) |
| Text Communication | Mobile Keyboard | Observed Typos | ... | abc8xtopry3579 + chksm (no "LMN" or "OP" combinations as they are adjacent keyboard keys) |
| ... | | ... | | ... |

ADAPTIVE SELECTION OF MESSAGE DATA PROPERTIES FOR IMPROVING COMMUNICATION THROUGHPUT AND RELIABILITY

BACKGROUND

The present invention generally relates to communications systems, and more specifically to the adaptive selection of message data properties for improving communication throughput and reliability.

A core operation of modern communications systems is to transmit analog and/or digital messages in a variety of forms, including for example, analog/digital data, audible communications, text communications, and the like. The transmission of data over a telecommunication network requires agreed-to message formats and communication-link control procedures for traffic interchange over these networks.

SUMMARY

Embodiments of the present invention provide a computer-implemented method for communicating a reference code for a transaction. A non-limiting example method includes monitoring a communication session conducted between a user and an agent via a communication channel. The method extracts one or more communication channel properties from the monitored communication session. The method extracts one or more user properties from the monitored communication session. The method selects a reference code from a set of references codes stored on a database, the selecting based at least in part on the extracted communication channel properties and the extracted user properties. The method communicates the selected reference code to the user.

Embodiments of the present invention provide a system for communicating a reference code for a transaction. The system includes one or more processors configured to perform a method. The method monitors a communication session conducted between a user and an agent via a communication channel. The method extracts one or more communication channel properties from the monitored communication session. The method extracts one or more user properties from the monitored communication session. The method selects a reference code from a set of references codes stored on a database, the selecting based at least in part on the extracted communication channel properties and the extracted user properties. The method communicates the selected reference code to the user.

Embodiments of the invention provide a computer program product for communicating a reference code for a transaction, the computer program product including a computer readable storage medium having program instructions embodied therewith. The program instructions are executable by a processor to cause the processor to perform a method. The method monitors a communication session conducted between a user and an agent via a communication channel. The method extracts one or more communication channel properties from the monitored communication session. The method extracts one or more user properties from the monitored communication session. The method selects a reference code from a set of references codes stored on a database, the selecting based at least in part on the extracted communication channel properties and the extracted user properties. The method communicates the selected reference code to the user.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 7 depicts an exemplary table of a database of the exemplary system shown in FIG. 6, in which the table maps combinations of extracted properties to reference codes in accordance with one or more embodiments of the present invention.

Figure 1:
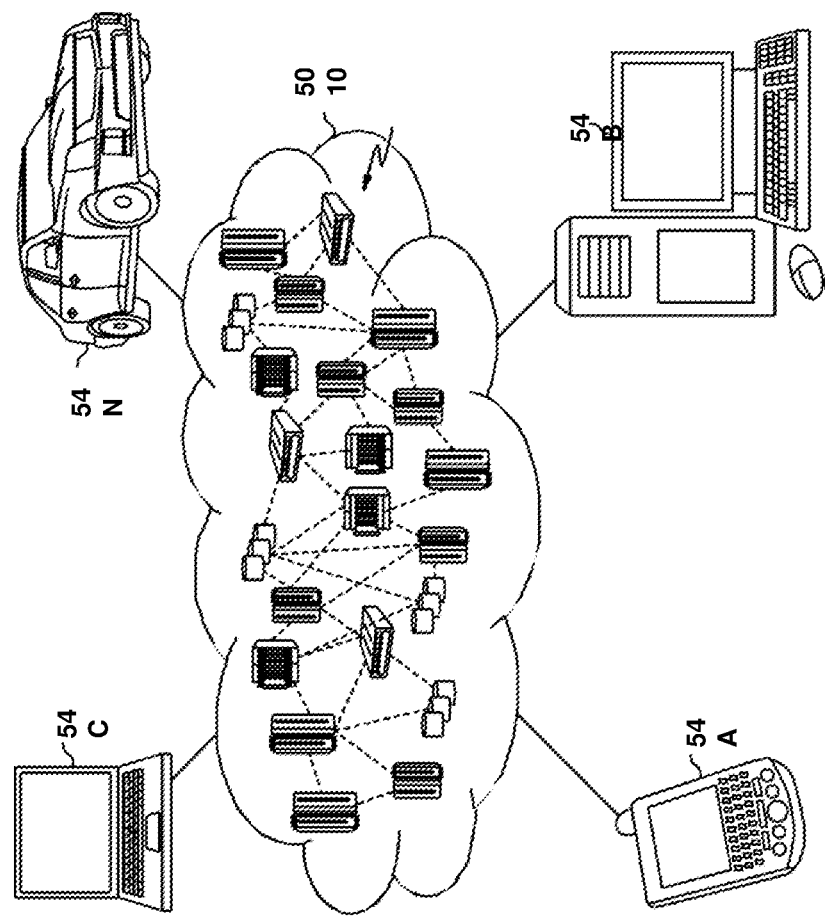
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
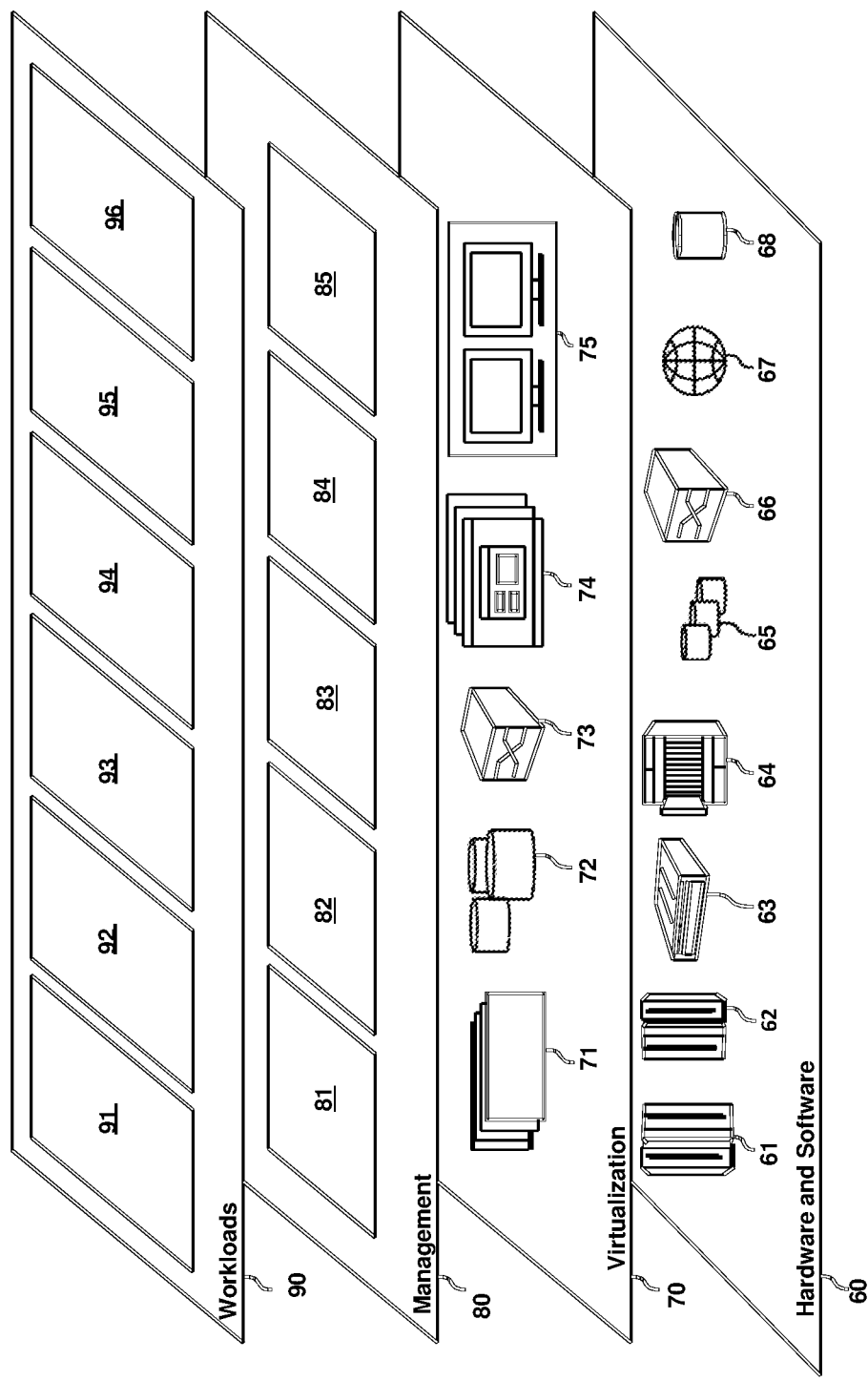
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and message data generation and selection processing 96.

Turning now to an overview of technologies that are more specifically relevant to aspects of the invention, as previously noted herein, the phrase "machine learning" broadly describes a function of electronic systems that learn from data. A machine learning system, engine, or module can include a trainable machine learning algorithm that can be trained, such as in an external cloud environment, to learn functional relationships between inputs and outputs that are currently unknown.

In computer-based transmission systems, the term "overhead" refers to any combination of excess or indirect computation time, memory, bandwidth, or other resources that are required to perform a specific task. Overhead can be a deciding factor in software design, with regard to structure, error correction, and feature inclusion. Examples of computing overhead may be found in function programming, data transfer, and data structures.

System overhead is impacted by how a source sends a signal (e.g., an analog or digital wave) to a target immersed in a particular environment so as to optimize its reception by the target. Optimization can involve minimizing or maximizing its ambiguity at the receiving end. Physical propagation in the environment may affect confusability with other, orthogonal signals, and it would be beneficial to either negatively or positively compensate for this with an automated adjustment of the signal at the source.

A variety of message data types are transmitted over communications systems. Reference codes are an example of message data that is routinely transmitted over various types of communications systems. Reference codes, such as airline record locators, purchase order numbers, and technical support ticket IDs, are frequently transmitted over some type of communication system to a customer in a customer/agent interaction. The communication of reference codes often constitutes a non-negligible time component of interactions between users and agents, especially if the interaction is carried over a noisy channel such as a dropout-prone mobile phone line. One problem that is particularly prevalent in customer/agent interactions is the high time and bandwidth cost (i.e., increased system overhead) that is associated with having to recommunicate a reference code to a user after the reference code is incorrectly received by the user. Reducing time and effort spent to communicate such reference codes will reduce system overhead, which improves various aspects of the process, including cost, time spent, and overall user satisfaction.

Various techniques have been proposed to adjust audio output, including in the case of speech generated automated suggests for semantically-similar context so as to improve reception quality. However those systems depend exclusively on real-time received feedback rather than pre-computed robust heuristics. Moreover, although fixed rule-based adjustment of text intended for speech are known, those systems have not taken into account environmental or channel properties in combination with user properties in the selection of a reference code.

Turning now to an overview of the aspects of the invention, one or more embodiments of the invention reduce the system overhead required to transmit message data such as reference codes by extracting both user and channel properties from a monitored communication session and then selecting a reference code from a database based at least in part on which channel and user properties were extracted from the monitor communication session. The phrase "database" as used herein broadly includes, but is not limited to, a repository on a computing system, which may represent a finite or infinite set of codes, e.g., one defined by a formal grammar. By selecting a reference code from a database based at least in part on not only user properties, but also channel and/or environmental properties, the system is able to minimize the likelihood that a user would be confused by characters found in a transmitted code thereby reducing the likelihood that transmitted reference code would need to be retransmitted to the user. In some embodiments of the invention, reference codes are classified in the database based at least in part on a difficulty likelihood associated with communicating each reference code through a particular channel and to a particular user, as such, the system reduces the overhead required to accurately transmit a reference code by searching the database for a reference code that corresponds to the combination of extracted properties.

Moreover, in some embodiments of the invention, to further reduce system overhead, the system is configured to use statistical properties of checksum violations, together with channel and user properties, to detect the existence of an error in a communicated reference code and/or to guide the dialog of the communication such as to identify the most probable point(s) of error in the code string. By using the statistical properties of checksum violations, the system reduces the overhead required to accurately transmit a reference code by quickly identifying the most likely points of error in a transmitted reference code without needing the user to recommunicate the transmitted reference code to the agent several times.

The above-described aspects of the invention address the shortcomings of the prior art by reducing the system overhead that is required to accurately transmit reference codes, in which the reduction is achieved by selecting reference codes stored in a database based at least in part on user and channel properties that are extracted from communication sessions such that the likelihood that a given user will be confused as to the characters in a communicated reference code is minimized.

Figure 3:
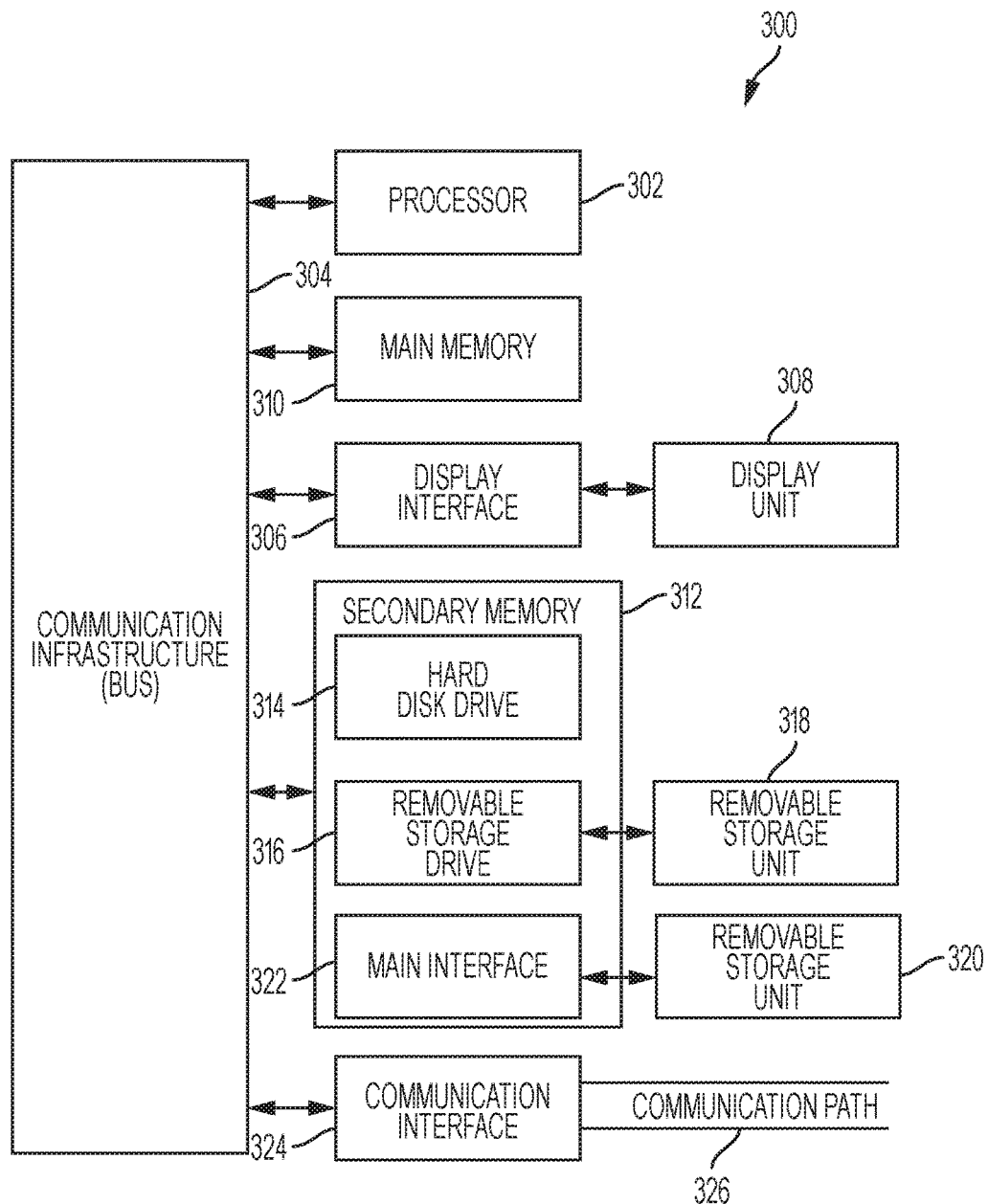
FIG. 3 depicts an exemplary computer system capable of implementing one or more embodiments of the present invention.

Turning now to a more detailed description of the present disclosure, FIG. 3 illustrates a high level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional system are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etcetera. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Figure 4:
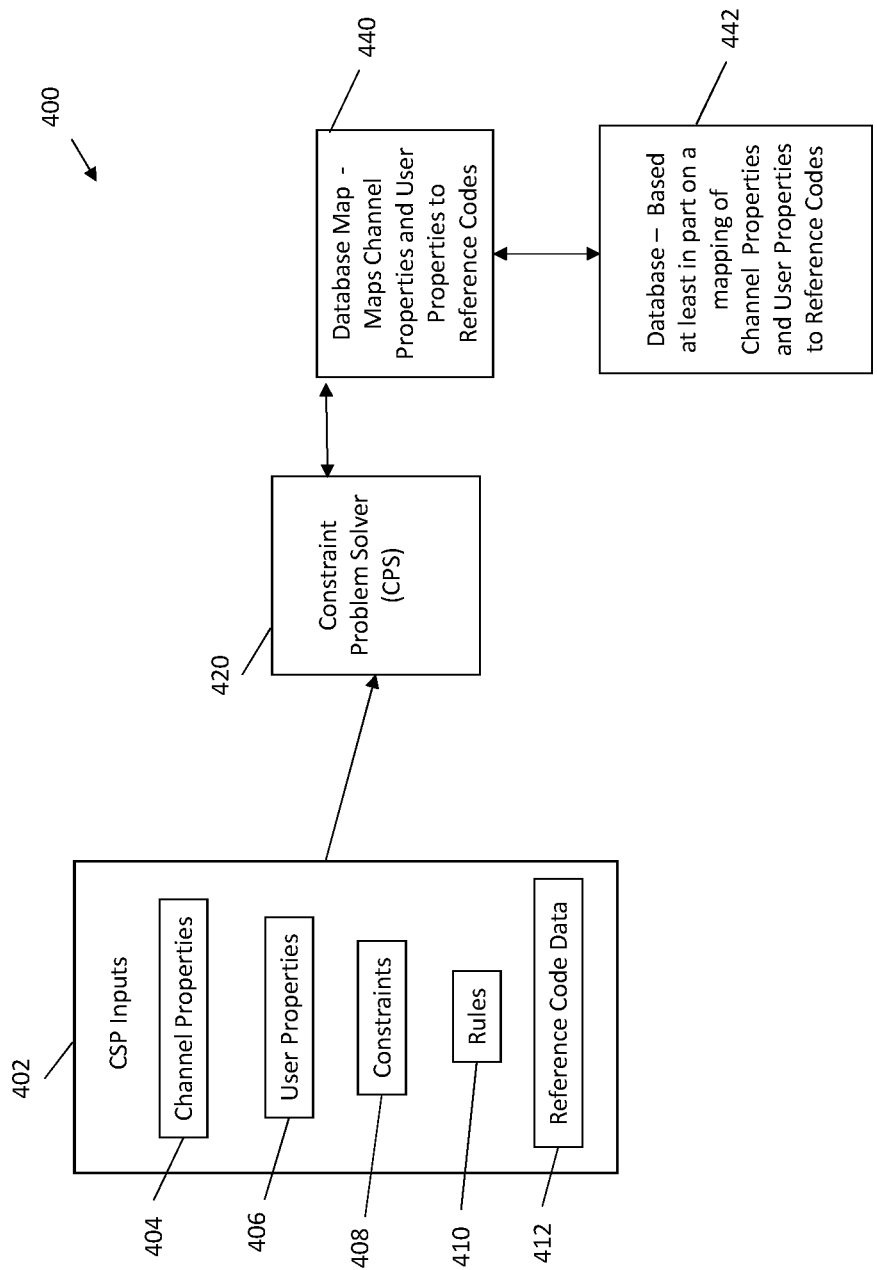
FIG. 4 depicts an exemplary system that generates a database map in accordance with one or more embodiments of the present invention.

FIG. 4 depicts a system 400 and associated methodology for generating a database map 440 according to one or more embodiments of the present invention. The database map 440, in accordance with embodiment of the invention, maps channel properties 404 and user properties 406 to reference codes 412 (i.e., message data) based at least in part on constraints 404 and rules 410. The database map 440, in accordance with the embodiments of the invention, can be used to create a database 442, which is based at least in part on a mapping of the channel properties 404 and the user properties 406 to the reference codes 412. The system 400 includes a constraint problem solver (CPS) 420 configured to receive CPS inputs 402 and utilize some or all of the received CPS inputs 402 to generate the database map 440. In some embodiments of the invention, the constraint problem solver 420 can be replaced with a machine learning system operating a machine learning algorithm. In embodiments of the invention, the CPS inputs 402 can include channel properties 404, user properties 406, constraints (or constraint problems) 408, rules 410 and database 442.

The term "rules" as referred to herein includes statements of what actions can be performed on a the database 422. The database 442 can be arranged in a variety of structured formats, including for example messages, flat files, data streams, web service calls, and the like. The constraints 408 and rules 410 are configured in a manner to identify the reference codes 412 having a high probability of being accurately received in one transmission taking into account channel properties 404 and user properties 406. In some embodiments of the invention, the database 442 can be a relational database (i.e., databases structured to recognize relationships among stored items of information) based on defined rules that are imposed on the reference codes 412, along with constraints on the rules. For example, because a relational database is organized into tables and columns, if a reference code is a sequence of three variables (or characters) XYZ, a rule and associated constraints can be defined that constrain X as, for example, a random number for certain user properties and certain channel properties.

The CPS inputs 402 present constrain satisfaction problems (CSPs) to the CPS 420. CSPs are mathematical problems defined as a set of objects whose state must satisfy a number of constraints or limitations. CSPs represent the entities in a problem as a homogeneous collection of finite constraints over variables, which is solved by constraint satisfaction methods using CPS 420. CSPs can exhibit high complexity, requiring a combination of heuristics and combinatorial search methods to be solved in a reasonable time. The Boolean satisfiability problem (SAT), the satisfiability modulo theories (SMT) and answer set programming (ASP) can be roughly thought of as certain forms of CSPs. The output of CSP solver 420 is the database map 440. According to one or more embodiments of the present invention, the database map 440 maps channel properties 404 and user properties 406 to reference codes 412 (i.e., message data) based at least in part on constraints 408 and rules 410. The database map 440, in accordance with the embodiments of the invention, can be used to create a database 442, which is based at least in part on a mapping of the channel properties 404 and the user properties 406 to the reference codes 412 based at least in part on constraints 408 and rules 410.

In some embodiments of the invention, the functionality of the CPS 420 can be a learning system that operates a machine learning algorithm. The phrase "machine learning" broadly describes a function of electronic systems that learn from data. A machine learning system, engine, or module can include a trainable machine learning algorithm that can be trained, such as in an external cloud environment, to learn functional relationships between inputs and outputs that are currently unknown.

Machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based at least in part on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

Figure 5:
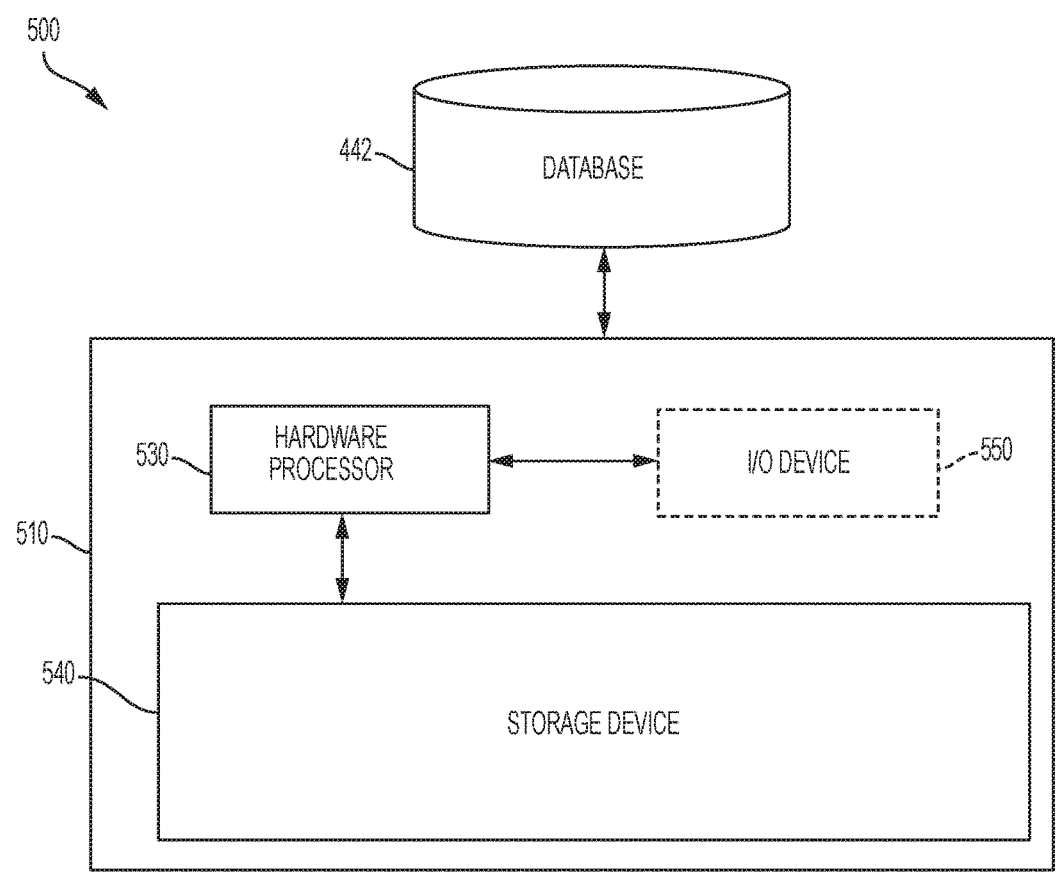
FIG. 5 depicts another exemplary computer system capable of implementing one or more embodiments of the present invention.

FIG. 5 depicts a system 500 capable of implementing one or more embodiments of the present invention. System 500 may include a computing device 510 and the database 442 (also depicted in FIG. 4). Computing device 510 may include a hardware processor 530, a storage device 540 and an optional input/output (I/O) device 550. Database 442 can include one or more databases, hardware processor 530 may include one or more hardware processors and storage device 540 may include one or more storage devices. The reference codes 412 (depicted in FIG. 4) can be stored in database 442 and/or storage device 540. Hardware processor 530 may be configured to execute the database map 440 of the system/method 400 of FIG. 4 and, to this end, may be in communication with database 442 and receive data therefrom. I/O device 550 may be configured to allow a user to interact with system 500. The dedicated software may be stored on storage device 540 and executed by hardware processor 530.

Database 442 may be stored on any one or more storage devices such as a flash disk, a random access memory (RAM), a memory chip, an optical storage device such as a CD, a DVD, or a laser disk, a magnetic storage device such as a tape, a hard disk, storage area network (SAN), a network attached storage (NAS), or others, or a semiconductor storage device such as a flash device, memory stick, or the like. Database 442 may be a relational database, a hierarchical database, object-oriented database, document-oriented database, or any other database.

Hardware processor 530 may be a central processing unit (CPU), a microprocessor, an electronic circuit, an integrated circuit (IC) or the like. Alternatively, computing device 510 may be implemented as firmware written for or ported to a specific processor such as digital signal processor (DSP) or microcontrollers, or can be implemented as hardware or configurable hardware such as field programmable gate array (FPGA) or application specific integrated circuit (ASIC). Hardware processors 530 may be utilized to perform computations required by computing device 510 or any of it subcomponents.

In some embodiments, computing device 510 may include an I/O device 550 such as a terminal, a display, a keyboard, a mouse, a touch screen, an input device or the like to interact with system 500, to invoke system 500 and to receive results. It will however be appreciated that system 500 can operate without human operation and without I/O device 550.

Computing device 510 may include one or more storage devices 540 for storing executable components, and which may also contain data during execution of one or more components. Storage device 540 may be persistent or volatile. For example, storage device 540 may be a flash disk, a random access memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as flash device, memory stick, or the like. In some exemplary embodiments, storage device 540 may retain program code operative to cause any of processors 530 to perform acts associated with any of the operation shown in FIG. 4 above, for example analyzing data for extracting rules, generating data in accordance with rules, or others.

In some exemplary embodiments of the disclosed subject matter, storage device 540 may include or be loaded with the user interface. The user interface may be utilized to receive input or provide output to and from system 500, for example receiving specific user commands or parameters related to system 500, providing output, or the like.

Figure 6:
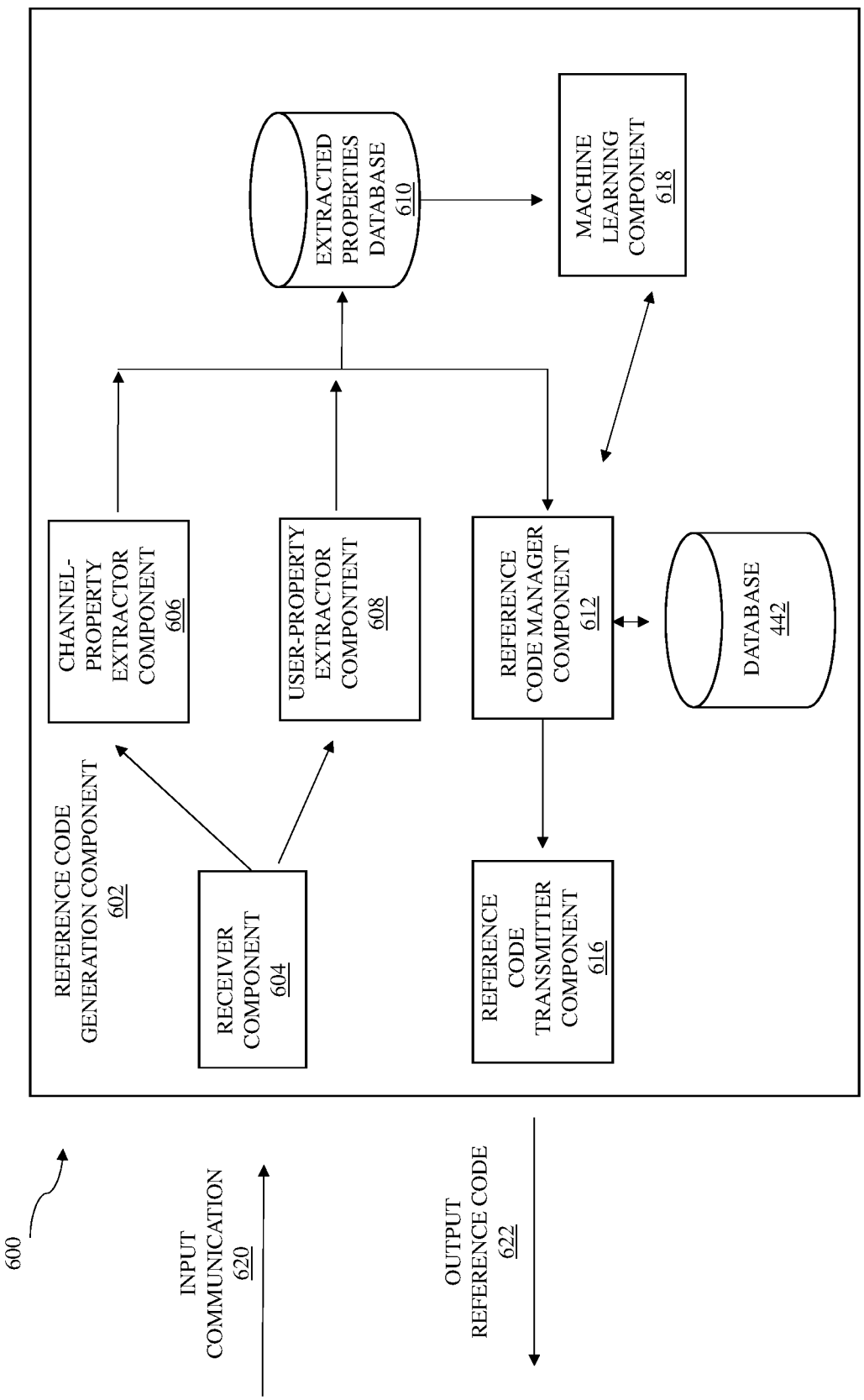
FIG. 6 depicts an exemplary system that facilitates reference code generation and communication in accordance with one or more embodiments of the present invention.

FIG. 6 illustrates a block diagram of a system 600 configured to facilitate message data generation and communication in accordance with one or more embodiments of the present invention. In the embodiment shown in FIG. 6, the message data is implemented as reference codes. System 600 provides an improved and more efficient approach to communicating reference codes or other message data to a user by selecting a reference code from a set of reference codes stored on a database, in which the reference code is selected based at least in part on channel-properties and user-properties that are extracted from a monitored communication session between a user and an agent. Examples of the problems addressed by system 600, which embodies aspects of the invention, include a reduction in the system resources (e.g., duration of the transmission, bandwidth usage, etc.) that are required in order to accurately transmit the reference codes. Accordingly, the system 600 avoids having to recommunicate a reference code to a user through a given media as a result of the reference code being incorrectly received by the user. Examples of technical improvements provided by aspects of the invention to address the above-described problems include a reduction in the likelihood that a particular user is confused by the characters found in a communicated reference code.

System 600 is a machine learning system that can be utilized to solve a variety of technical issues (e.g., learning previously unknown functional relationships) in connection with technologies such as, but not limited to, reference code generation and communication technologies, feature extraction technologies, machine learning technologies, time series data technologies, data analysis technologies, data classification technologies, data clustering technologies, trajectory/journey analysis technologies, medical device technologies, collaborative filtering technologies, recommendation system technologies, signal processing technologies, word embedding technologies, topic model technologies, image processing technologies, video processing technologies, audio processing technologies, and/or other digital technologies. System 600 employs hardware and/or software to solve problems that are highly technical in nature, that are not abstract and that cannot be performed as a set of mental acts by a human. In certain embodiments of the invention, some or all of the processes performed by system 400 are performed by one or more specialized computers (e.g., one or more specialized processing units, a specialized computer with a time series data component, etc.) for carrying out defined tasks related to machine learning. In some embodiments of the invention, system 600 and/or components of the system are employed to solve new problems that arise through advancements in technologies mentioned above, employment of extracted properties from a communication, machine learning process, and/or computer architecture, and the like. In some embodiments of the invention, system 400 provides technical improvements to feature extracting systems, reference code generation systems, machine learning systems, artificial intelligence systems, data analysis systems, data analytics systems, data classification systems, data clustering systems, trajectory/journey analysis systems, medical device systems, collaborative filtering systems, recommendation systems, signal processing systems, word embedding systems, topic model systems, image processing systems, video processing systems, and/or other digital systems. One or more embodiments of the invention, system 400 also provide technical improvements to a central processing unit associated with a machine learning process by improving processing performance of the central processing unit, reducing computing bottlenecks of the central processing unit, improving processing efficiency of the central processing unit, and/or reducing an amount of time for the central processing unit to perform the machine learning process.

In the embodiment shown in FIG. 6, system 600 includes a reference code generation component 602 that includes a receiver component 604, a channel-property extractor component 606, a user-property extractor component 608, an extracted properties database 610, a reference code manager component 612, a database 442 (also depicted in FIGS. 4-5), a reference code transmitter component 616, and a machine learning component 618. In some embodiments of the invention, reference code generation component 602 constitutes machine-executable component(s) embodied within machine(s), (e.g., embodied in one or more computer readable mediums (or media) associated with one or more machines). Such component(s), when executed by the one or more machines, (e.g., computer(s), computing device(s), virtual machine(s), etc.) cause the machine(s) to perform the operations described. In some embodiments of the invention, reference code generation component 602 includes a memory that stores computer executable components and instructions. Furthermore, in some embodiments of the invention, reference code generation component 602 includes a processor to facilitate execution of the instructions (e.g., computer executable components and corresponding instructions) by reference code generation component 602. In some embodiments of the invention, receiver component 604, channel-property extractor component 606, user-property extractor component 608, extracted properties database 610, reference code manager component 612, database 442, reference code transmitter component 616, machine learning component 618, a memory, and/or a processor are electrically and/or communicatively coupled to one another.

In general, reference code generation component 602 is configured to receive an input communication 620 and to output a reference code 622 that is adaptively selected from a database 442 including a set of reference codes, the selection being based at least in part on channel and user properties that are extracted from the input communication 620. In some embodiments of the invention, the selection is based at least in part on classifying the set of reference codes in the database based at least in part on extracted channel and user properties such that the confusability of characters in the output reference code 622 is minimized.

In some embodiments of the invention, a reference code includes one or more characters or symbols selected from a set of characters or symbols. In some embodiments of the invention, a reference code includes a code point portion including one or more alphanumeric characters or symbols and a checksum portion including one or more alphanumeric characters, in which the checksum portion is calculated based at least in part on the code point portion. In some embodiments of the invention, the checksum is a single extra digit appended to the end of the code point portion which is computed deterministically from all the other digits of the reference code (e.g., code point portion characters and symbols).

An example of a checksum that may be appended to a numeric code is the sum of the digits of the code point portion in modulo 10. Other suitable checksums can be used such as, for example, SNOMED CT medical codes. SNOMED CT medical codes contain a built-in checksum based at least in part on the dihedral group which not only detects all single-digit errors but also all transpositions of adjacent digits.

Receiver component 604 is configured to receive an input communication 620. In some embodiments of the invention, the receiver component 604 receives the input communication 620 by monitoring a communication session conducted between a user and an agent. In some embodiments of the invention, the monitoring includes receiver component 604 acting as a communication conduit or funnel through which communication data is sent and/or received between an agent and a user. In some embodiments of the invention, receiver component 604 is a passive or active probe that listens or intercepts communications conducted between a user and an agent. In some embodiments of the invention, the receive component is configured to receive offline input communication (e.g., previously recorded communications between an agent and a user). Types of input communication 620 include, for example, an e-mail service, a text message service (or SMS), an instance message service, a phone service, a chat session, and/or a forum post, etc. In some embodiments of the invention, when the received communication is not text-based (e.g., a voice of video communication), the receiver component 604 is configured to transcribe the communication into text using a suitable speech-to-text transcription engine. Receiver component 604 is further configured to transmit the resulting communication data to one or more property extractors (e.g., channel-property extractor component 606, user-property extractor component 608, and/or an environmental-property extractor (not shown)).

Channel-property extractor component 606 is configured to extract one or more channel properties from the monitored communication session. Channel properties extracted from an input communication 620 include, but are not limited to, information regarding the type of communication mode (e.g., e-mail, text message, instant message, voice message, online chat, mobile phone, land line phone, Voice over IP, message sent via a real keyboard, message sent via virtual keyboard, etc.). Channel-property extractor component 606 is configured to transmit the extracted channel properties to reference code manager component 612 for further processing. In some embodiments of the invention, channel-property extractor component 606 stores the extracted channel-properties in an extracted properties database 610 such that machine learning component 618 can process the extracted properties at a later time to update or construct a classification algorithm for classifying the set of reference codes based at least in part on a difficulty likelihood associated with communicating the respective reference code through a particular communication channel.

In some embodiments of the invention, the extracted channel properties reveal the susceptibility of the user to be confused by certain characters in a reference code. For example, in voice (telephone) communication, letters such as "b" and "p" (and voiced/unvoiced phonemes in general) or "m" and "n" are likely acoustically confusable. In text based communications, the letter "l" is likely confusable with number "1", and similarly number "0" and letter "o".

In some embodiments of the invention, various groups of characters are confusable to a user based at least in part on the type of keyboard or keyboard representation (e.g. on-screen keyboard) that is used by the user. For example, the grouping "lmn" is potentially confusable when entered on a virtual keyboard as the letters are often located near each other on the virtual keyboard. Additionally, as a user may wish to read a reference code from an email or a printer and then speak the reference code to the agent over the phone, in some embodiments of the invention, both acoustic and visually confusable information are used to influence the selection of the reference code by the reference code manager component 612.

User-property extractor component 608 is configured to extract one or more user properties from the monitored communication session. Extracted user-properties reveal the user's susceptibility to confusable characters in a reference code. Example user properties include, but are not limited to, a user's hearing or typing abilities, a user's communication ability in a given language, a user's communication ability in a given dialect, and/or a user's typographical errors that are detected in the communication session. Various combinations of characters may by confusable for a specific user, depending on the user's hearing or typing abilities, and on the user's communication abilities in a given language and/or dialect, (e.g. dealing with "Z" pronounced as "zee" versus "zed", user whose primary language does not distinguish between a given pair of characters (e.g. "L" and "R").

In some embodiments of the invention, user-property extractor component 608 extracts some or all of the user properties through the use of natural language processing tools (e.g., the user's communication ability in a given language and/or dialect). In some embodiments of the invention, user properties are extracted by executing spell check software on text data of the monitored communication session to detect typographical errors. In some embodiments of the invention, user properties are extracted by retrieving user account data previously stored in memory and evaluating the retrieved user account data to identify the user's susceptibility to confusable characters. In some embodiments of the invention, the retrieved user account data includes, the user's name, phone number, social security number, password, credit card number, security question, and/or other user identifying data. In some embodiments of the invention, the user account data is retrieved directly from the user in real-time during an ongoing communication session.

User-property extractor component 608 is configured to transmit the extracted user properties to reference code manager component 612 for further processing. In some embodiments of the invention, user-property extractor component 608 stores the extracted user-properties in the extracted properties database 610 such that machine learning component 618 can process the extracted properties at a later time to update or construct a classification algorithm or classifier for classifying the set of reference codes based at least in part on a difficulty likelihood associated with communicating the respective reference code through a particular communication channel and to a particular user.

Reference code manager component 612 is configured to maintain a database including models and/or a set of reference codes (e.g., database 442) and to select a reference code from the set of references codes based at least in part on the extracted communication channel properties and the extracted user properties. In some embodiments of the present invention, the database is maintained using constraint problem solver 420 and database map 440 of FIG. 4. In some embodiments of the invention, database 442 includes one or more sets of tables in which the set of reference codes are classified based at least in part on a difficulty likelihood associated with communicating the respective reference code through a particular communication channel and to a particular user. In some embodiments of the invention, the reference code manager component 612 is configured to select a reference code from the set of reference codes by at least providing a query to database 442 with a corresponding combination of one or more of the extracted properties (e.g., one or more extracted user properties, one or more extracted channel properties, one or more extracted environmental properties, one or more combinations of extracted user, channel, and/or environmental properties). Reference code manager component 612 is configured to provide the selected code to the reference code transmitter component 616 in preparation for communication to the user.

FIG. 7 depicts an exemplary table 700 of database 442, in which the table maps combinations of extracted properties to reference codes in accordance with one or more embodiments of the present invention. Table 700 includes a set of N number of reference codes that are mapped to M number of extracted properties. In some embodiments of the invention, the mapping is established based a predetermined mapping of particular combinations of extracted features to predetermined reference codes or portions of reference codes that have been identified as minimizing the confusability of characters in the reference code. In some embodiments of the invention, alternatively or additionally, the scheme is automatically learned and/or updated via machine learning by processing prior monitored communications such that the confusability of reference codes is minimized for particular combinations of user, channel, and/or environmental properties.

In FIG. 7, the reference codes are mapped to certain combinations of extracted properties. In the first row, a default reference code is provided as the code is not mapped to any particular combination of extracted properties (e.g., a reference code having code point portion of "abclmnopr12345" and an appended checksum). In the second row, a channel property that indicates that the monitored communication is a text based communication is mapped to a reference code that does not include the number "1" or the letter "l" (e.g., a reference code having code point portion of "abc8mnopry2345" and an appended checksum). In the third row, a channel property that indicates that the monitored communication is a telephone communication is mapped to a reference code that does not include the letters "b" or "p" (e.g., a reference code having code point portion of "a8clmno4r12345" and an appended checksum). In the fourth row, a combination of (a) a channel property that indicates that the monitored communication is a telephone communication and (b) a user property indicating that a user's primarily language does not distinguish between the letters "l" and "r", is mapped to a reference code that does not include the letters "b", "p", "l", and "r" (e.g., a reference code having code point portion of "a8cxmno4y12345" and an appended checksum). In the fifth row, a combination of (a) a channel property that indicates that the monitored communication is a text based communication, (b) a channel property indicating that a mobile keyboard is being used by the user, and (c) a user property indicating the existence of typos in the monitored communication, is mapped to a reference code that does not include combinations of letters that appear near each other on a mobile keyboard, for example the combination of letters "lmn" and "op" (e.g., a reference code having code point portion of "abc8xtopry3579" and an appended checksum). It is understood by persons skilled in the art that other suitable combinations of properties and reference codes can be used in accordance with one or more embodiments of the present disclosure.

In some embodiments of the invention, the reference code manager component 612 is configured to select the reference code by utilizing information known to both the user and the agent to reduce a search space of the database and selecting the reference code from a query of the reduced search space. By utilizing information known to both sides of the communication (such as date, time phone numbers, social security number, and credit card number), the efficiency of computing resources is improved because the search space needed to select the reference code is reduced. In some embodiments, reducing the search space in this manner allows for a reduction in the size of database 442 and thus reduces the memory size that is needed for storing the reference codes in the database 442.

Referring back to FIG. 6, reference code transmitter component 616 is configured to receive the selected reference code from the reference code manager component 612 and to communicate the selected reference code to the user (e.g., output reference code 622). In some embodiments of the invention, the reference code transmitter component 616 is configured to communicate the selected reference code to the user via direct communication. Direct communication can include, for example, generating a voice-based message (e.g., an interactive voice response that includes the selected reference code) or transmitting a text-based message (e.g., generating a chat response, e-mail, forum post, or text message that includes the selected reference code). In some embodiments of the invention, the reference code transmitter component 616 is configured to communicate the selected reference code to the user indirectly. Indirect communication can include, for example, generating or updating a script that is to be provided (or is being provided) to the agent during the communication session with the user. For example, in some embodiments of the invention, reference code transmitter component 616 includes a scripting engine that prompts the agent with the selected reference code (e.g., output reference code 622). In some embodiments of the invention, the scripting engine changes a provided script in real-time as the user, channel, and/or environmental properties are extracted.

In FIG. 6, machine learning component 618 is configured to process a machine learning model based at least in part on the extracted properties that are stored in the extracted properties database 610. In some embodiments of the invention, the properties extracted by the channel-property extractor component 606, user-property extractor component 608, and/or environmental extractor (not shown), are provided as input to a machine learning model executed by the machine learning component 618. In certain embodiments of the invention, the machine learning component 618 executes a classification machine learning model using the extracted properties that are stored in the extracted properties database 610. In some embodiments of the invention, the classification machine learning model is a machine learning model that maps extracted properties that are stored in the extracted properties database 610 to one or more categories. In another example, machine learning component 618 executes a regression machine learning model using extracted properties stored in the extracted properties database 610. In some embodiments of the invention, the regression machine learning model is a machine learning model that determines relationships among extracted properties stored in the extracted properties database 610.

In some embodiments of the invention, machine learning component 618 executes a clustering machine learning model using the extracted properties stored in the extracted properties database 610. In some embodiments, the clustering machine learning model is a machine learning model that groups related data extracted properties stored in the extracted properties database 610 into a corresponding group, for example, via a nearest neighbor's algorithm. In some embodiments of the invention, the machine learning component 618 generates a classification model that is used by the reference code manger component 412 to classify reference codes based at least in part on their corresponding level of confusability. In some embodiments of the invention, machine learning component 618 implements a reinforced machine learning algorithm based at least in part on feedback received from detected checksum violations and other detected reference code verification errors.

It is to be appreciated that the reference code generation component 602 (e.g., receiver component 604, channel-property extractor component 606, user-property extractor component 608, extracted properties database 610, reference code selector component 612, database 442, and machine learning component 618) performs an input communication receiving process, a channel-property extraction process, a user-property extraction process, a reference code selection process, a reference code transmission process, and/or a machine learning process associated with extracted property data (e.g., extracted properties database 610) that cannot be performed by a human (e.g., is greater than the capability of a single human mind). In some embodiments of the invention, an amount of extracted property data being processed, a speed of processing of extracted property data, and/or data types of extracted property data processed by reference code generation component 602 (e.g., receiver component 604, channel-property extractor component 606, user-property extractor component 608, extracted properties database 610, reference code selector component 612, and database 442) over a certain period of time are greater, faster, and/or different than an amount, speed, and data type that can be processed by a single human mind over the same period of time. In some embodiments of the invention, the reference code generation component 602 (e.g., receiver component 604, channel-property extractor component 606, user-property extractor component 608, extracted properties database 610, reference code selector component 612, and database 442) is fully operational towards performing one or more other functions (e.g., fully powered on, fully executed, etc.) while also performing the above-referenced input communication receiving process, channel-property extraction process, user-property extraction process, reference code selection process, reference code transmission process, and/or machine learning process associated with extracted property data (e.g., extracted properties database 610).

In some embodiments of the invention, machine learning component 618 employs one or more artificial intelligence techniques to execute at least one machine learning model that is based at least in part on the extracted feature data. For example, in some embodiments of the invention, machine learning component 618 extracts information that is indicative of correlations, inferences, and/or expressions from the extracted property data based at least in part on principles of machine learning. In some embodiments of the invention, machine learning component 618 generates a machine learning output based at least in part on the execution of the at least one machine learning model using the extracted property data. In some embodiments of the invention, the machine learning output includes, for example, learning, correlations, inferences, and/or expressions associated with the extracted property data.

In some embodiments of the invention, machine learning component 618 performs learning with respect to the extracted feature data explicitly or implicitly. In some embodiments of the invention, machine learning component 618 employs an automatic classification system and/or an automatic classification process to facilitate analysis of extracted property data. For example, in some embodiments of the invention, machine learning component 618 employs a probabilistic and/or statistical-based analysis (e.g., factoring into the analysis utilities and costs) to learn and/or generate inferences with respect to the extracted property data. In some embodiments of the invention, machine learning component 618 employs, for example, a support vector machine (SVM) classifier to learn and/or generate inferences for the extracted feature data. Additionally or alternatively, in some embodiments of the invention, machine learning component 618 employs other classification techniques associated with Bayesian networks, decision trees, and/or probabilistic classification models.

Classifiers employed by the machine learning component 618 can be explicitly trained (e.g., via a generic training data) as well as implicitly trained (e.g., via receiving extrinsic information). For example, with respect to SVM's, SVM's can be configured via a learning or training phase within a classifier constructor and feature selection module. A classifier can be, for example, a function that maps an input attribute vector, $x=(x_1, x_2, x_3, x_4, x_n)$, to a confidence that the input belongs to a class—that is, $f(x)$=confidence (class). In some embodiments of the invention, a classifier is trained such that reference codes are classified based at least in part on a difficulty likelihood associated with communicating a respective reference code through a particular communication channel and to a particular user.

In some embodiments of the invention, machine learning component 618 includes an inference component (not shown) that further enhances automated aspects of the machine learning component 618 utilizing in part inference based schemes to facilitate learning, and/or generating inferences for the extracted property data. In some embodiments of the invention, machine learning component 618 employs any suitable machine-learning based techniques, statistical-based techniques, and/or probabilistic-based techniques. For example, in some embodiments of the invention, machine learning component 618 employs expert systems, fuzzy logic, SVMs, Hidden Markov Models (HMMs), greedy search algorithms, rule-based systems, Bayesian models (e.g., Bayesian networks), neural networks, and/or other non-linear training techniques, data fusion, utility-based analytical systems, systems employing Bayesian models, etc. In some embodiments of the invention, machine learning component 618 performs a set of machine learning computations associated with analysis of the extracted feature data. For example, in some embodiments of the invention, machine learning component 618 performs a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, Gaussian mixture model machine learning computations, a set of regularization machine learning computations, a set of rule learning machine learning computations, a set of Bayesian machine learning computations, a set of deep Boltzmann machine computations, a set of deep belief network computations, a set of convolution neural network computations, a set of stacked auto-encoder computations, and/or a set of different machine learning computations.

In some embodiments of the invention, reference code generation component 602 is configured to utilize statistical properties of checksum violations to detect the existence of an error in a reference code that is provided by the user to the agent, and/or to guide the dialog between the user and the agent to the most probable point(s) of error in the code string, thereby saving considerable time over asking the user to repeat the entire reference code. For example, in some embodiments of the invention, the reference code generation component 602 is configured to receive a second reference code from the user, in which the second reference code includes a code point portion and a checksum portion. In some embodiments, the receiving of the second reference code may occur when an agent wishes to confirm prior to ending the communication session that the output reference code 622 was correctly received by the user with the user. The receiving of the second reference code may also occur when the agent wishes to validate a reference code that was provided to the user during a different communication session. The second reference code can be the same as the prior communicated reference code or can be a different reference code all together. To that end, in some embodiments of the invention, the reference code generation component 602 is configured to detect whether the second reference code is erroneous by calculating a checksum from the code point portion and comparing the calculated checksum with the checksum portion. Upon detecting that the calculated checksum and the checksum portion differ, the reference code generation component identifies a one or more likely positions of code point error in the code point portion of the second reference code, in which the identification is based at least in part on the extracted user properties and the extracted channel properties. In some embodiments of the invention, using statistical properties of common errors identified by the machine learning component 618, the reference code generation component 602 is configured to generate a list of the most likely locations of a reference code error in the second reference code (e.g., top 10 reference code errors) under the assumption that the checksum portion of the second reference code is itself correct. In some embodiments of the invention, the reference code generation component 602 automatically suggests clarifying dialog to the agent, for example: "In the third position did you mean B as in bravo or C as in Charlie?" Utilizing the statistical properties of common errors further improves system 600's ability to reduce the time or bandwidth needed to effectively communicate a reference code (e.g., avoiding the need for a user or agent to repeat the entire reference code after detection of a code point error).

In some embodiments of the invention, the methods and systems described herein are extendible to any audio signal (e.g., speech, music, etc.) which travels through a distorting medium. For example, in some embodiments of the invention, the system 600 is configured to generate a set of oral directives that are resilient to intrinsic confusability and physical environmental factors that affect intelligibility of a signal sent to a user through a distorting medium. In some embodiments of the invention, intrinsic confusability in the signal extends beyond character-level confusability. For example, some word-level confusability can be considered as some words are inherently ambiguous by virtue of being homonyms, (e.g., "aisle" vs. "isle") and some word combinations are both phonetically and semantically hard to disambiguate (e.g., "do you have a name vs. "do you have an aim'). In some embodiments of the invention, physical environmental factors include background noise, acoustics, distance the user is from the source of the signal, and/or atmospheric conditions that affect intelligibly of the signal at the receiving end.

The extended functionally identified above can be implemented for a variety of environments. For example, an emergency response team working in an environment with some extreme weather condition (heavy rain, wind, fog, etc.) may utilize the extended system 600 to generate a set of oral directives that are resilient to those environmental conditions. Brevity code words like "roger" and "10-4" were originally designed for emergency response environment, but now that Incident Command Systems encourage plain speech, there is freedom in expression and optimal design of communicated words in each situation is relevant. In another example environment, a speaker desires to speak in a way that is intentionally ambiguous under certain conditions, (e.g. at distances more than a few meters, for privacy preservation) and thus system 600 is extended to generate a set of oral directives are generated that maximize ambiguity. In another example environment, large conference venues with competing audio from different vendors may benefit from a collaborative optimization of all signals' reception within a short radius of their respective tables, and thus the extended system 400 generated oral directives that are optimized to minimize ambiguity within the short radius and maximize ambiguity outside the short radius.

In some embodiments of the invention, the methods and systems described herein are extendible to include a visual display that changes its output depending on the targeted audience and environment. For example, in some embodiments of the invention, the extended visual display functionality generates a visual message that automatically changes to effect better communication of information to a user based at least in part on detecting various circumstances that affect confusability. For example, in some embodiments of the invention, the extended visual display functionality causes a road sign to change the size of font, brightness, and color on the overhead display screen based at least in part on the distance to the driver and ambient atmospheric conditions. Different words or patterns chosen from a standard lexicon or image database are displayed based at least in part on their resilience to these conditions.

In some embodiments of the invention, the extended visual display functionality causes an image on a cell phone or computer display to be adjusted based at least in part on a distance of the user to their cell phone or computer display. For example, a cell phone camera can detect where the person is with respect to the camera. The image aspect, color, and brightness can then be modified to most effectively convey the message.

Figure 8:
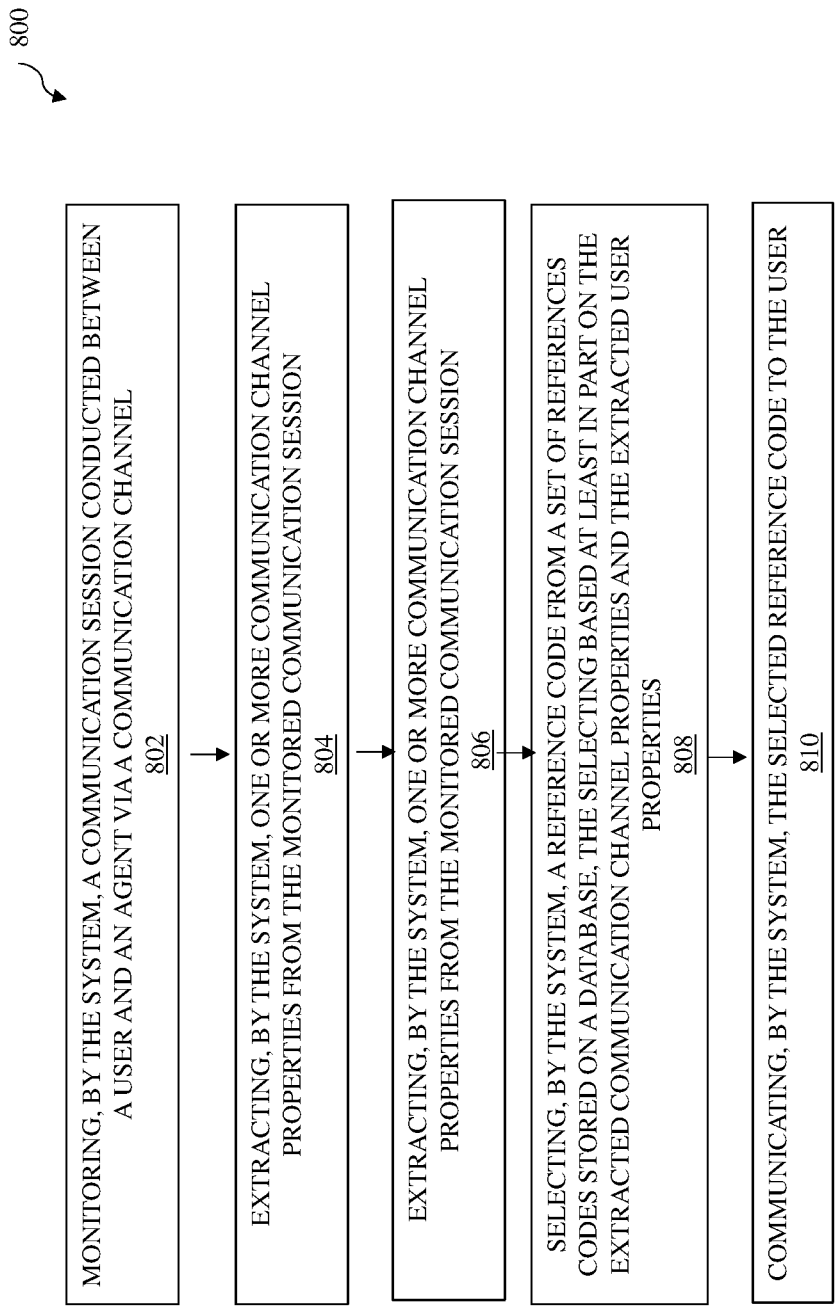
FIG. 8 depicts a flow diagram illustrating a methodology in accordance with one or more embodiments of the present invention.

Additional details of the operation of system 600 will now be described with reference to FIG. 8, wherein FIG. 8 depicts a flow diagram illustrating a methodology 800 according to one or more embodiments of the present invention. At 802, a communication session conducted between a user and an agent via a communication channel is monitored by a system operatively coupled to a processor (e.g., by receiver component 604). At 804, communication channel properties are extracted from the monitored communication session by the system (e.g., by channel-property extractor component 606). At 806, user properties are extracted from the monitored communication session by the system (e.g., by user-property extractor component 608). At 808, a reference code is selected by the system from a set of reference codes stored on a database (e.g., reference code manager component 612), in which the selection is based at least in part on the extracted communication channel properties and the extracted user properties. At 810, the selected reference code is communicated by the system to the user (e.g., by reference code transmitter component 616).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments of the invention, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for communicating a reference code for a transaction comprising:
   monitoring, by a system operatively coupled to one or more processors, a communication session conducted between a user and an agent via a communication channel;
   extracting, by the system, one or more communication channel properties from the monitored communication session;
   extracting, by the system, one or more user properties from the monitored communication session;
   selecting, by the system, a reference code from a set of references codes stored in a database, wherein the selected reference code includes a checksum, the selecting based at least in part on the extracted communication channel properties and the extracted user properties;
   communicating, by the system, the selected reference code to the user;
   receiving, by the system, a second reference code from the user, wherein the second reference code includes a code point portion and a checksum portion;
   detecting, by the system, whether the second reference code is erroneous by calculating a checksum from the code point portion and comparing the calculated checksum with the checksum portion;
   upon detecting that the calculated checksum and the checksum portion differ, identifying, by the system, one or more likely positions of code point error in the code point portion of the second reference code based at least in part on the extracted user properties and the extracted channel properties; and
   upon detecting the one or more likely positions of code point error, guiding a dialog to elicit correct reference code from the user.

2. The computer-implemented method of claim 1, wherein each reference code is classified based at least in part on a difficulty likelihood associated with communicating the reference code through a particular communication channel.

3. The computer-implemented method of claim 1, wherein the extracted channel properties include information related to a communication mode type of the monitored communication.

4. The computer-implemented method of claim 1 further comprising extracting, by the system, one or more environmental properties from the monitored communication session, wherein the selection of the reference code is based at least in part on the extracted communication channel properties, the extracted user properties, and the extracted environmental properties.

5. The computer-implemented method of claim 1, wherein the communicating of the selected reference code to the user includes:
   generating, by the system, an interactive voice response that includes the reference code; and
   communicating, by the system, the interactive voice response to the user.

6. The computer-implemented method of claim 1, wherein selecting the reference code includes utilizing information known to both the user and the agent to reduce a search space of the database and to select the reference code from a query of the reduced search space.

7. A computer program product for communicating a reference code for a transaction, the computer program product comprising a computer readable storage medium having program instructions embodied therewith, wherein the computer readable storage medium is not a transitory signal per se, the program instructions executable by a system operatively coupled to one or more processors to cause the system to perform a method comprising:
   monitoring, by the system, a communication session conducted between a user and an agent via a communication channel;
   extracting, by the system, one or more communication channel properties from the monitored communication session;
   extracting, by the system, one or more user properties from the monitored communication session;
   selecting, by the system, a reference code from a set of references codes stored in a database, wherein the selected reference code includes a checksum, the selecting based at least in part on the extracted communication channel properties and the extracted user properties;
   communicating, by the system, the selected reference code to the user;
   receiving, by the system, a second reference code from the user, wherein the second reference code includes a code point portion and a checksum portion;
   detecting, by the system, whether the second reference code is erroneous by calculating a checksum from the code point portion and comparing the calculated checksum with the checksum portion;
   upon detecting that the calculated checksum and the checksum portion differ, identifying, by the system, one or more likely positions of code point error in the code point portion of the second reference code based at least in part on the extracted user properties and the extracted channel properties; and upon detecting the one or more likely positions of code point error, guiding a dialog to elicit correct reference code from the user.

8. The computer program product of claim 7, wherein each reference code is classified based at least in part on a difficulty likelihood associated with communicating the reference code through a particular communication channel.

9. The computer program product of claim 7, wherein the extracted channel properties include information related to a communication mode type of the monitored communication.

10. The computer program product of claim 7 further comprising extracting, by the system, one or more environmental properties from the monitored communication session, wherein the selection of the reference code is based at least in part on the extracted communication channel properties, the extracted user properties, and the extracted environmental properties.

11. The computer program product of claim 7, wherein the communicating of the selected reference code to the user includes:
   generating, by the system, an interactive voice response that includes the reference code; and
   communicating, by the system, the interactive voice response to the user.

12. The computer program product of claim 7, wherein selecting the reference code includes utilizing information known to both the user and the agent to reduce a search space of the database and to select the reference code from a query of the reduced search space.

13. A system for communicating a reference code for a transaction, the system comprising one or more processors configured to perform a method comprising:
   monitoring, by the system, a communication session conducted between a user and an agent via a communication channel;
   extracting, by the system, one or more communication channel properties from the monitored communication session;
   extracting, by the system, one or more user properties from the monitored communication session;
   selecting, by the system, a reference code from a set of references codes stored in a database, wherein the selected reference code includes a checksum, the selecting based at least in part on the extracted communication channel properties and the extracted user properties;
   communicating, by the system, the selected reference code to the user;
   receiving, by the system, a second reference code from the user, wherein the second reference code includes a code point portion and a checksum portion;
   detecting, by the system, whether the second reference code is erroneous by calculating a checksum from the code point portion and comparing the calculated checksum with the checksum portion;
   upon detecting that the calculated checksum and the checksum portion differ, identifying, by the system, one or more likely positions of code point error in the code point portion of the second reference code based at least in part on the extracted user properties and the extracted channel properties; and
   upon detecting the one or more likely positions of code point error, guiding a dialog to elicit correct reference code from the user.

14. The system of claim 13, wherein each reference code is classified based at least in part on a difficulty likelihood associated with communicating the reference code through a particular communication channel.

15. The system of claim 13, wherein the method further includes extracting, by the system, one or more environmental properties from the monitored communication session, wherein the selection of the reference code is based at least in part on the extracted communication channel properties, the extracted user properties, and the extracted environmental properties.

16. The system of claim 13, wherein the communicating of the selected reference code to the user includes:
   generating, by the system, an interactive voice response that includes the reference code; and
   communicating, by the system, the interactive voice response to the user.

17. The system of claim 13, wherein selecting the reference code includes utilizing information known to both the user and the agent to reduce a search space of the database and to select the reference code from a query of the reduced search space.

* * * * *